July 12, 1932.                J. R. PEIRCE                1,867,027
                         ACCOUNTING MACHINE
                    Filed Aug. 6, 1930    12 Sheets-Sheet 1

FIG. I.

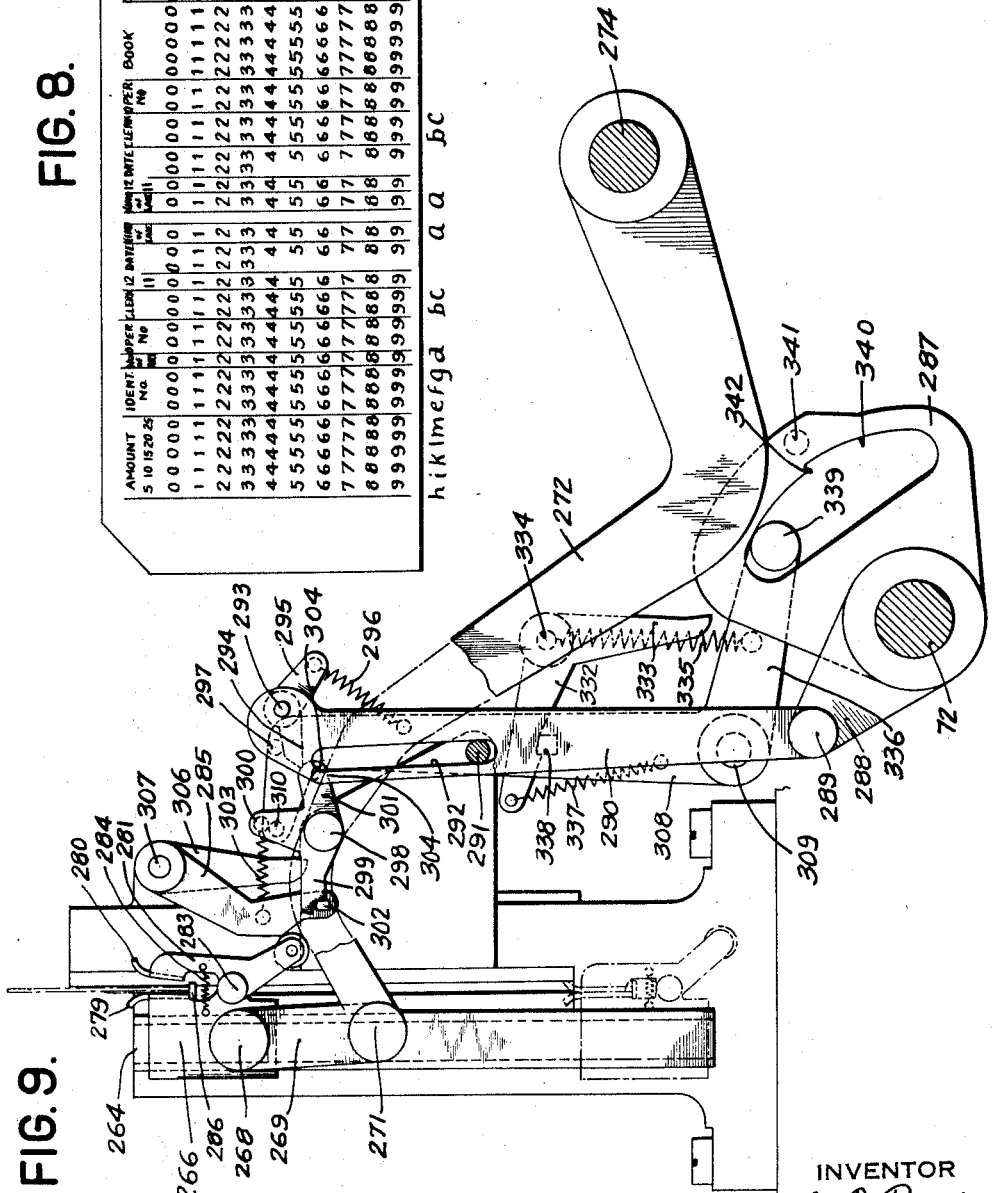

July 12, 1932. J. R. PEIRCE 1,867,027
ACCOUNTING MACHINE
Filed Aug. 6, 1930  12 Sheets-Sheet 8
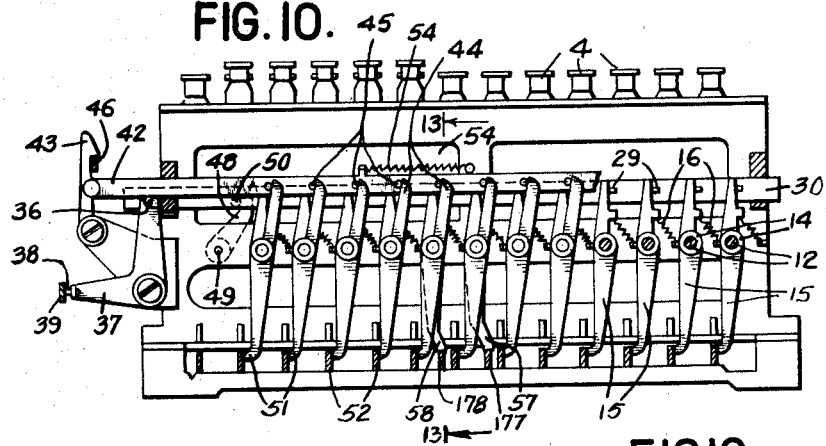
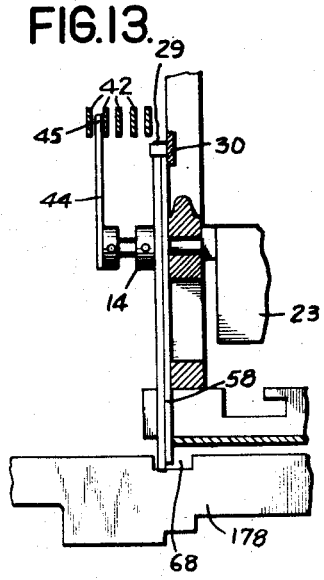 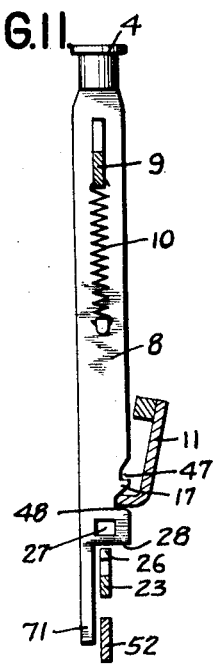 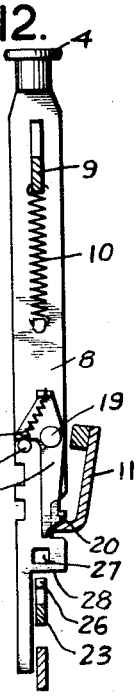
INVENTOR
BY ATTORNEY  J. R. Peirce July 12, 1932.  J. R. PEIRCE  1,867,027
ACCOUNTING MACHINE
Filed Aug. 6, 1930   12 Sheets-Sheet 9
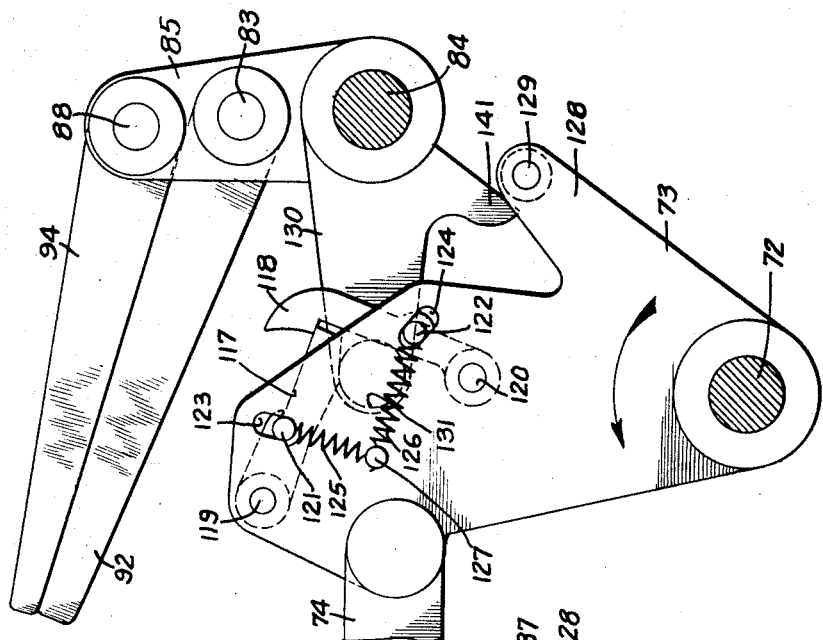
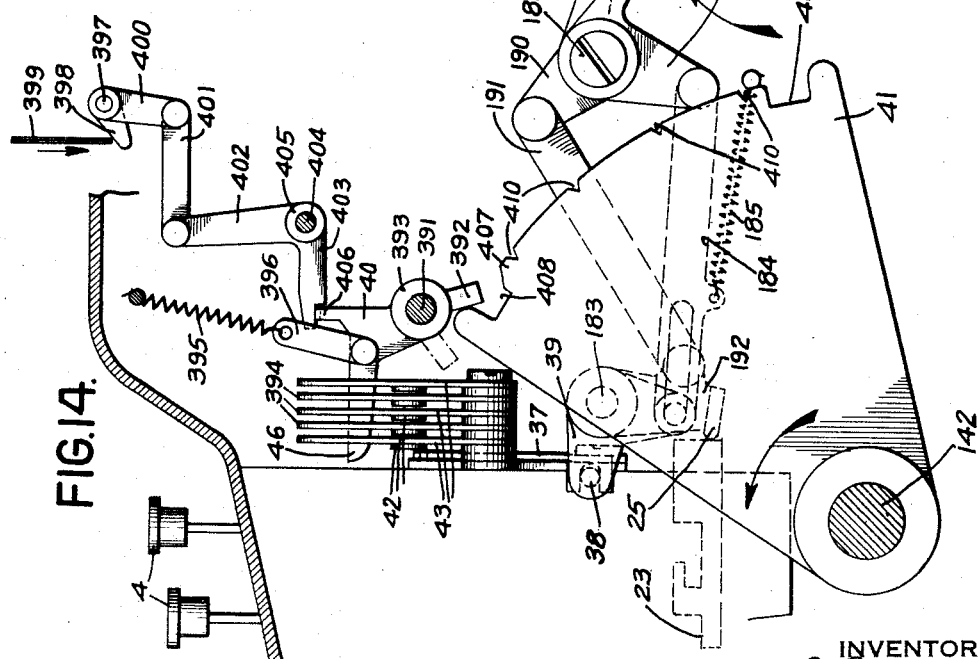
INVENTOR
BY ATTORNEY July 12, 1932.   J. R. PEIRCE   1,867,027
ACCOUNTING MACHINE
Filed Aug. 6, 1930   12 Sheets-Sheet 10

INVENTOR
J. R. Peirce
BY ATTORNEY
W. M. Wilson

July 12, 1932.  J. R. PEIRCE  1,867,027
ACCOUNTING MACHINE
Filed Aug. 6, 1930  12 Sheets-Sheet 11
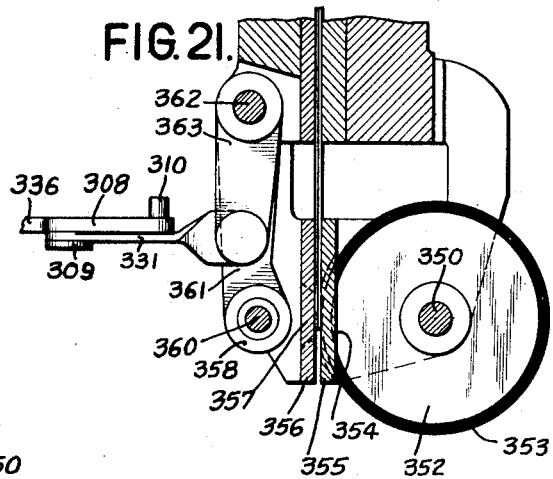
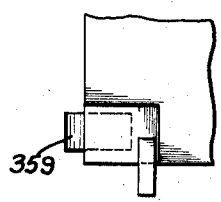
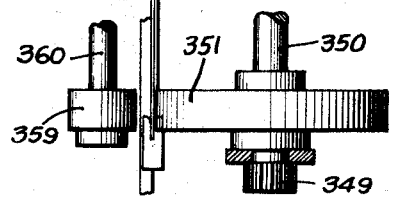
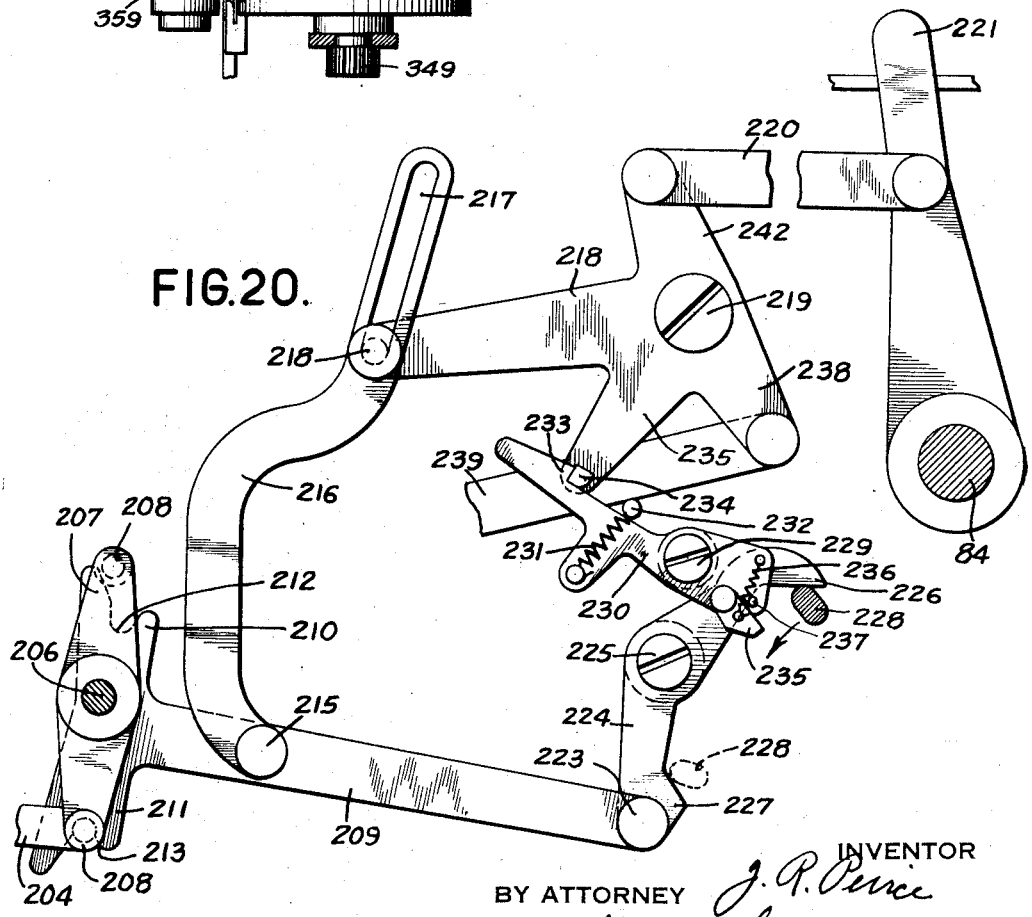

July 12, 1932.   J. R. PEIRCE   1,867,027
ACCOUNTING MACHINE
Filed Aug. 6, 1930   12 Sheets-Sheet 12
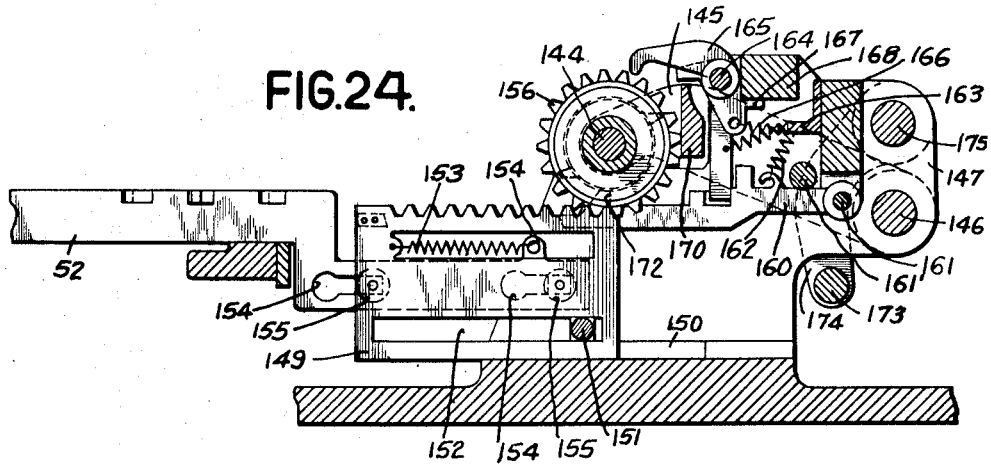
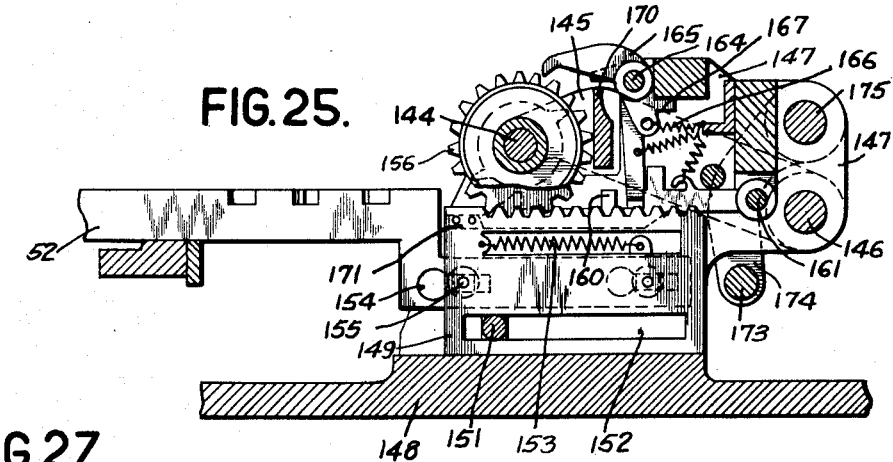
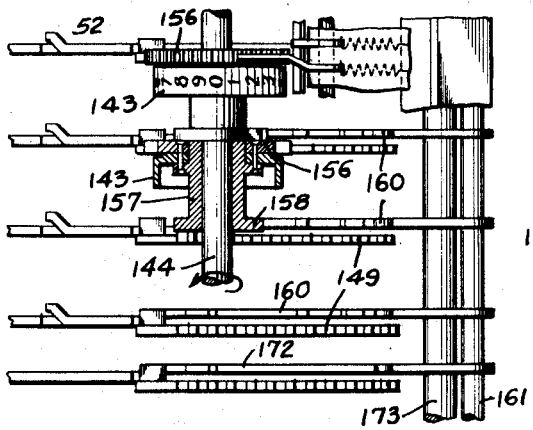
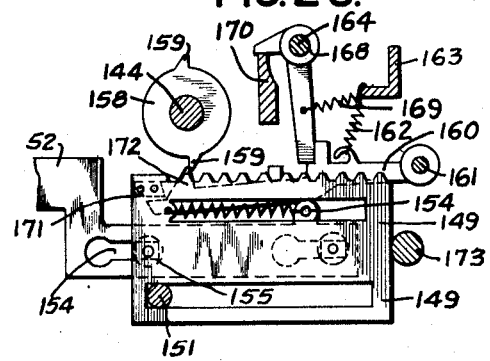
INVENTOR
J. R. Peirce
BY ATTORNEY Patented July 12, 1932

1,867,027

UNITED STATES PATENT OFFICE

JOHN ROYDEN PEIRCE, OF NEW YORK, N. Y., ASSIGNOR, BY MESNE ASSIGNMENTS, TO THE TABULATING MACHINE COMPANY, OF NEW YORK, N. Y., A CORPORATION OF NEW JERSEY

ACCOUNTING MACHINE

Application filed August 6, 1930. Serial No. 473,367.

The present invention relates to a recording machine particularly for sales checks and the like and provides means to punch a record card in accordance with certain data and to enter simultaneously amounts into an accumulator corresponding to the punched records. The present machine provides a key mechanism which is adapted to control both the punching device and the accumulator when the record cards are prepared.

It is, however, desirable to have total cards punched in accordance with the adjustment of the accumulator and it is therefore the main object of the present invention to provide in a key controlled punching machine having an accumulator mechanism means to control the punching mechanism by the accumulator in order to obtain a punched total card.

Another object is to provide selective means to control the punching mechanism either by the key mechanism or by the accumulator.

Another object of the invention is to put the accumulator under the control of the key mechanism after it has controlled the punching mechanism.

Still another object of the invention is to provide a single series of punching elements, a plurality of selectors for said single series of elements and a series of controlling devices for said selectors.

Another object of the invention is to provide means to convey cards from the punching position differently depending upon a predetermined designation of said cards.

Another object is to convey cards of one kind into a receptacle and to eject after the punching operation, cards which have a predetermined designation.

Other objects and advantages will be hereinafter set forth in the accompanying specification and claims and illustrated in the drawings which show by way of illustration what is considered to be a preferred embodiment of the invention.

In the drawings:

Fig. 8 shows a blank record card;

Fig. 9 shows a detail view of the card feeding mechanism;

Figs. 10 to 13 show the key mechanism and its associated locking means; Fig. 13 represents a section on the line 13—13 of Fig. 10;

Fig. 14 shows details of the locking means for the actuating mechanism of the machine;

Fig. 15 is a detail of the punch actuating mechanism;

Fig. 20 shows the controlling means for the accumulator to shift the same into different positions;

Figs. 21 to 23 show details of the card feed mechanism, and;

Figs. 24 to 27 show various views and details of the accumulating mechanism.

Figure 1:
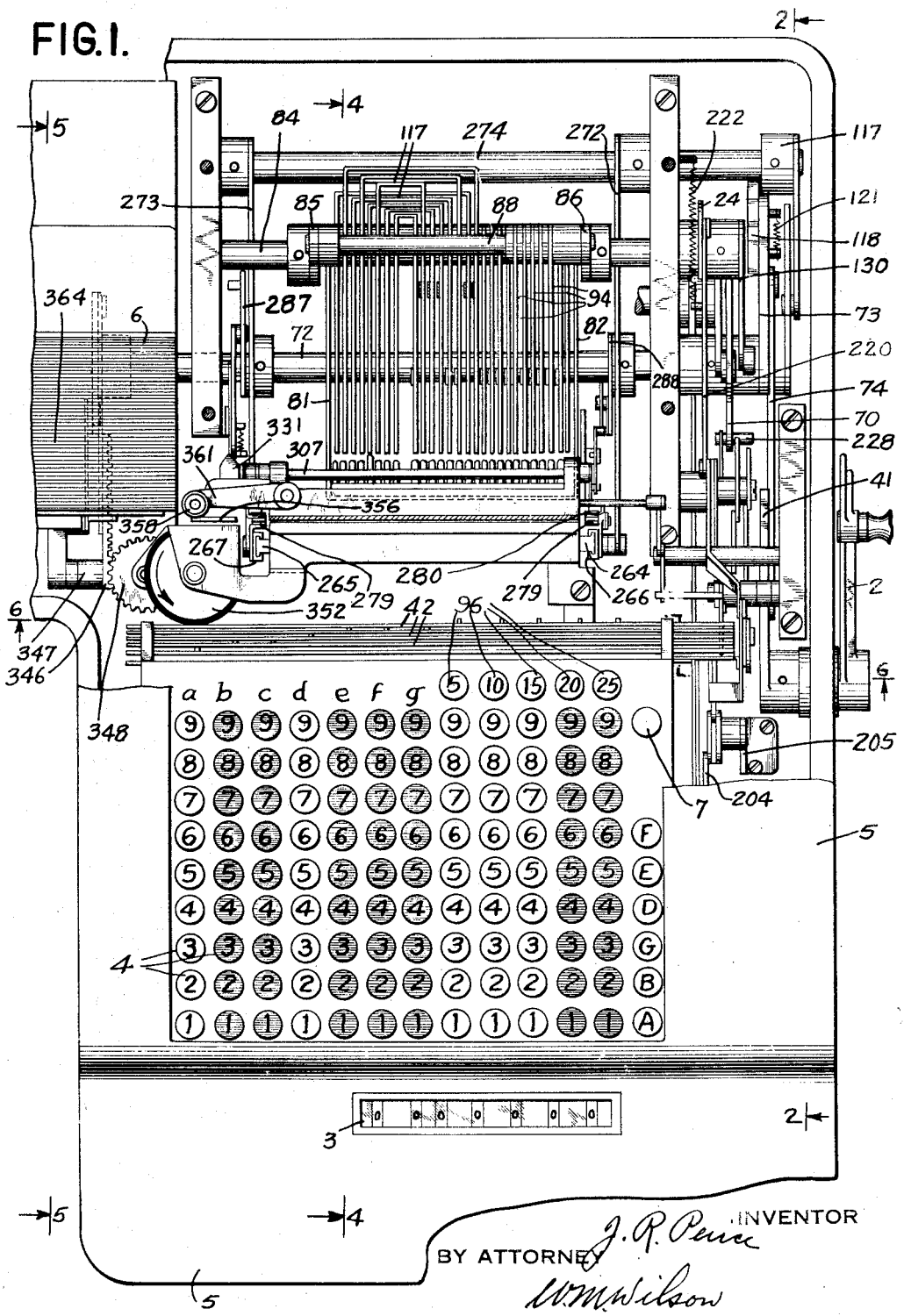
Fig. 1 is a top view of the machine, the top cover being partly broken away to show the interior mechanism of the machine.

The principal parts of the machine according to the invention comprise a punching device, a key mechanism to control punch controlling elements; an accumulator mechanism which may be controlled by said punch controlling elements and which in turn may control said elements in order to punch a total card. In addition card feeding and storing mechanisms are provided.

The operating parts are located in the housing generally designated by reference numeral 5. On the top side (Fig. 1) is provided a key board comprising a plurality of keys 4, one key for each numeral in the various columns of different denominational orders. A window 3 is provided in the top plate and beneath the same are located the number wheels of the accumulator, these wheels indicate the total of item cards and if a total card is being punched under the control of the accumulator, the wheels are zeroized and the operator may readily see whether the total has been properly punched.

Figure 2:
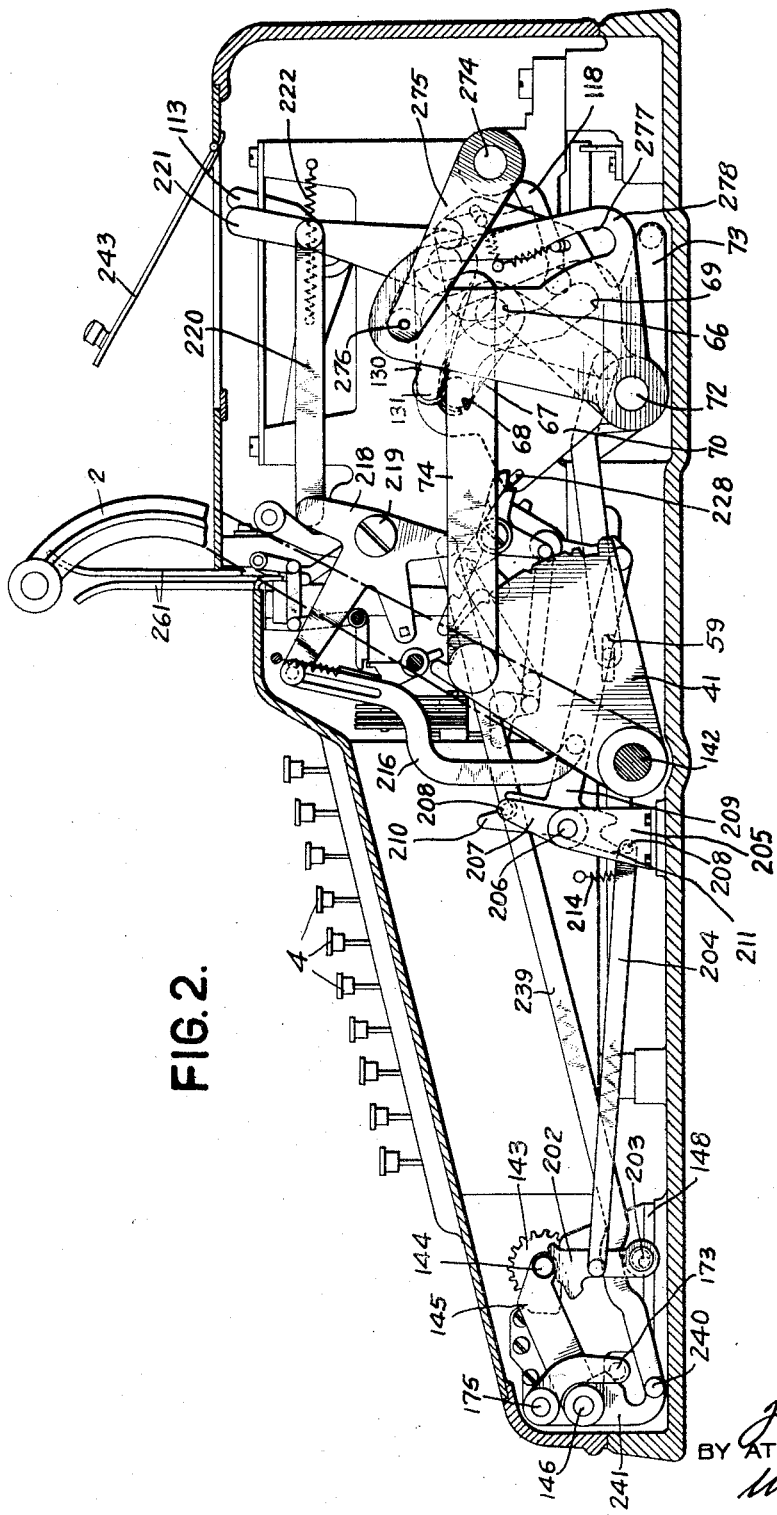
Fig. 2 is a sectional view on line 2—2 of Fig. 1.
Figure 3:
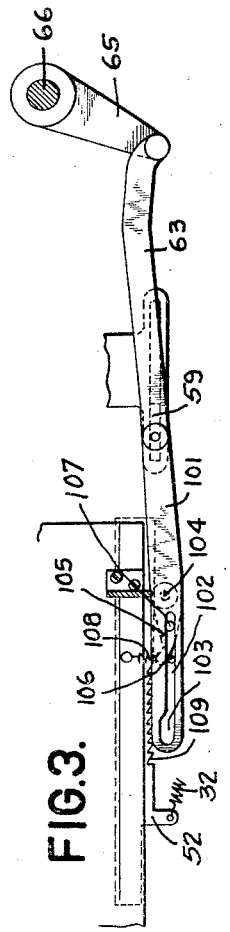
Fig. 3 shows a detail of the locking mechanism for the key controlled controlling bars.

Before the machine is actuated for an item entry a blank card is inserted into the guiding chute 261 (Fig. 2). Then, after setting up the key board according to the item to be entered the handle 2 is actuated in the usual manner and the amount entered into the accumulator and simultaneously the inserted card will be taken into punching position and punched accordingly. The punched card is then fed by suitable feeding means to the receptacle 6. Total cards i. e., cards which are to be punched under control of the accumulator are provided with cut away portions which cause the feeding mechanism to eject them again so that they are not mixed with the item cards which are fed to the receptacle.

*Key control mechanism*

The different columns of keys are arranged in accordance with the arrangement of certain columns on the record card (Figs. 1 and 8). Thus the column $a$ to the extreme left of the key board is provided for the column "kind of sale" on the record card. The date may be set by special levers as will be described later. Columns $b$ and $c$ of the keys serve to set up the clerk number which is to be punched upon the card. The operator's number is adjusted by special levers in a similar way as the date; punching in card column "number" of article is controlled by the keys of column $d$ and the identification number is set up in columns $e$, $f$, $g$. Finally, for the "amount" are provided five columns on the card and accordingly columns $h$—$m$ on the key board.

Special keys bearing the designations "5", "10", "15", "20" and "25" are provided and those keys control punching of holes above each column in the amount field of the record card which holes indicate the discount. Reference numeral 7 designates the error key which is depressed when a setting of the key is to be corrected. The error key causes all set up keys which are held in locking position to be released so that they are ready for a new and proper adjustment.

Keys "A, B, C, D, E, F" are provided to control drawers such as are usually provided in cash registers but they have been omitted in this case since they they do not concern the scope of the invention.

Figure 4:
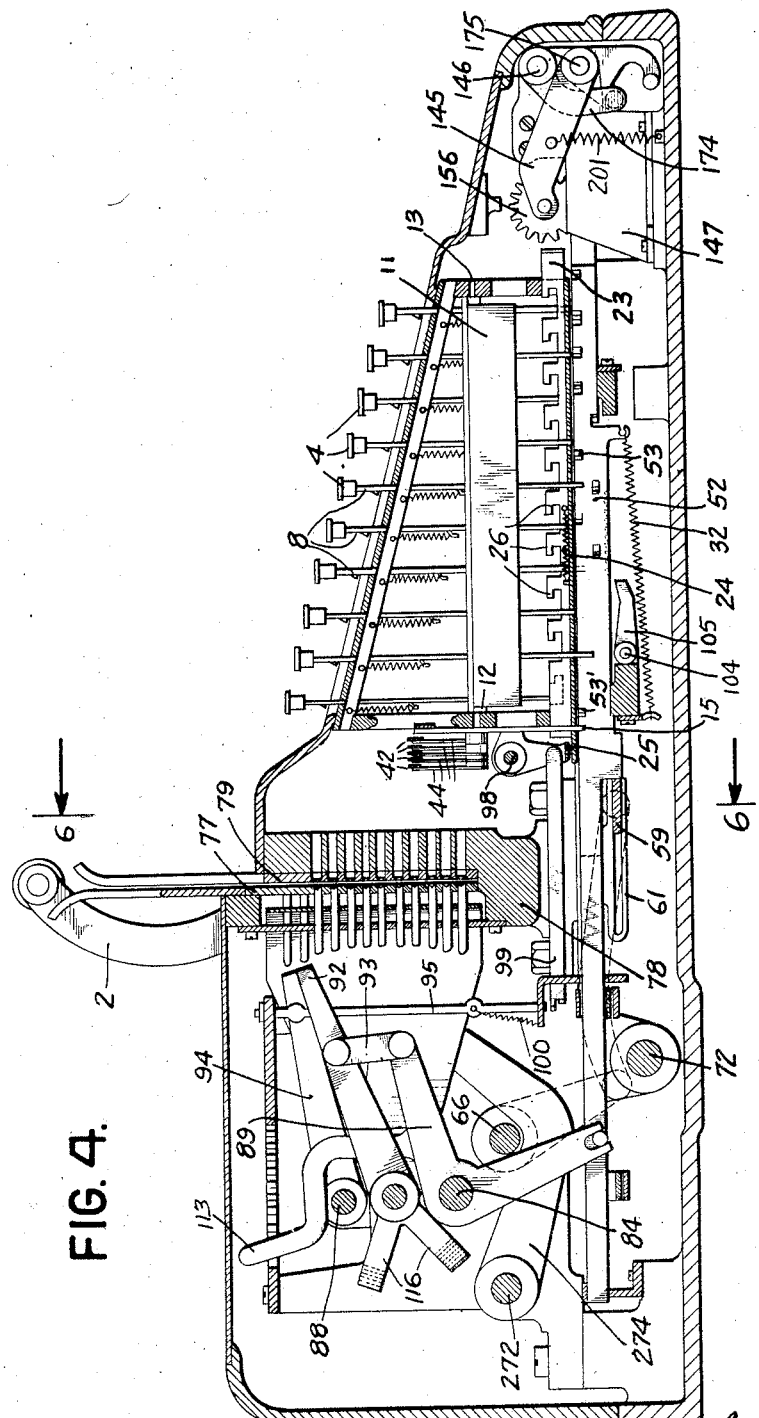
Fig. 4 is a sectional view taken through the machine on line 4—4 of Fig. 1.

The stems 8 of the keys 4 (Figs. 4, 11 and 12) are guided on bars 9, one of which is provided for each column and which extends through a slot in each stem, a spring 10 fast to the stem 8 at one end and to the bar 9 at the other end normally holds the keys in upper postion. For each column there is also provided a locking plate 11 common to all keys of the column and pivoted at its ends to the frame of the machine as shown at 12 and 13. Each pivot 12 carries a sleeve 14 (Figs. 10 and 13) having a double arm lever 15. The upper arm of each lever 15 is connected with sleeve 14 of the adjacent lever 15 by a spring 16 and the spring of the extreme right hand lever 15 is fastened to the frame of the machine. It will be recognized that in consequence of the tendency of springs 16 to turn levers 15 in clockwise direction the locking bars 11 will normally engage the lower notches of stems 8 as shown in Figs. 11 and 12. If, however, in a certain column a key is depressed lip 17 (Fig. 11) will rock plate 11 counterclockwise (as viewed in Fig. 11) and as soon as the key has been depressed far enough, the plate will catch behind lip 17 into the upper notch of stem 8 thus holding the key depressed. If the wrong key has been depressed it is only necessary to press the proper key in the same column whereupon the locking plate 11 will release the first depressed key and lock the newly depressed key.

This arrangement however would not be suitable for all keys of the columns $h$—$m$ where properly two keys may be depressed in the same column, namely one of the discount keys "5"—"25" and a digit key in the same column. Both keys must then remain locked. In order to meet these requirements the keys "5"—"25" have a shape as shown in Fig. 12 and are provided with a latching member 18. The member is pivoted at 19 to the stem 8 and has on one arm a lip 20 which serves the same purpose as the lip 17 of a regular stem 8 as shown in Fig. 12. A spring 21 normally holds the member 18 in the position shown in Fig. 12 where the upper arm of the member to which one end of the spring 21 is fastened engages the stop 22 to which the other end of the spring 21 is fast. When a certain digit key in one of the amount columns is depressed the locking bar 11 will be rocked and will lock the depressed key in down position. If the wrong key has been actuated it is simply necessary as in all other columns to press the proper digit key which will be locked whereas the wrongly depressed key is released. Then one of the five discount keys is depressed and due to the pawl member 18 with which each of these keys is provided, the plate 11 will not be rocked so that the depressed digit key in the respective column remains in its down position. The tension of the comparatively weak spring 21 will be overcome by plate 11 in the path of lip 20 so that member 18 will be rocked clockwise and finally catch beneath bar 11 thus locking the depressed discount key against upward movement.

In order to lock all keys positively during actuating operations of the machine special bars 23 (Figs. 4, 11, 12, 16) are provided. These bars are normally in the position shown in Fig. 4 but a spring 24 tends to move the bar to the left against stop rod 25. At the beginning of the operating cycle the rod 25 is moved automatically to the left and frees the bars 23 for movement. Each bar 23 is provided with a plurality of fingers 26 adapted to pass into slots 27 of stems 8. A finger 26 passes into the slot 27 of a depressed key while the upper edges of fingers 26 pass beneath edges 28 of stems 8 and it will be seen that in this way all stems will be locked in their position until they are unlocked at the end of the machine cycle by moving bars 23 to the right through rod 25.

The upper arms of each lever 15 (Fig. 10) engages a stop 29 of a common releasing bar 30. The releasing bar 30 has on one end a pin 36 which engages in a slot in the vertical arm of the pivotally mounted bell crank 37. The horizontal arm of this bell crank has a bent terminal portion provided with a slot which cooperates with a pin 38 attached to the bell crank lever 39 (see also Fig. 14). When the pivoted lever 39 is automatically rocked at the end of the machine cycle in a way as will be described later, lever 37 will be rocked and in turn the releasing bar 30 will be instantaneously moved to the left so as to cause levers 15 and consequently also locking bars 11 to move to releasing position whereupon all keys return to their normal position.

The plates 11 and the locking bars 23 in their function just described are under the control of pin 228 attached to plate 70 (see Figs. 2 and 20) which is moved in unison with the actuating handle. Referring to Fig. 14, the bell crank lever 39 is pivoted upon shaft 183 and has a pin and slot connection with link 184 which is connected by a spring 185 with the frame of the machine. The link 184 is pivoted at its other end to bell crank lever 186, 187 which is loosely mounted upon stud 188. On the same stud is also loosely mounted lever 189, 190. The arm 190 is pivotally connected to link 191 which in turn is pivoted to one of the supports 192 for the restoring bail 25 common to all locking bars 23. When the parts are in normal position as shown in Fig. 2 pin 228 engages arm 189 and holds lever 189, 190 turned counterclockwise. This causes engagement of bail 25 with locking bars 23 which are thus held in unlocking position. When the handle is actuated after the key board has been set up pin 228 (Fig. 14) moves counterclockwise thus releasing arm 189 and permitting bars 23 to move to the right under the influence of springs 24 and to lock the stems of the key board. Of course, bail 25 and the associated linkage will be moved accordingly as will be readily recognized from Fig. 14. After pin 228 has left arm 189 on its downward movement it encounters arm 187 and rocks lever 186, 187 clockwise but in view of the pin and slot connection between 39 and 184 this rocking will be of no effect upon lever 39.

Linkage 184, 186, 187 will therefore return under the influence of spring 185 to its normal position after pin 228 has passed beneath arm 187. Pin 228 then moves downward during the first half stroke and reaches the position shown in Fig. 14 towards the end of its return movement in the second half stroke. In this position pin 228 will encounter arm 187 and during its further movement will turn lever 186, 187 counterclockwise and consequently rock lever 39 about pivot 183. In view of the pin and slot connection of 39 with lever 37 (see also Fig. 10) lever 37 will be rocked and by moving bar 30 to the left all bars 11 will be shifted to releasing position as has been already explained. Immediately afterwards pin 228 encounters arm 189 and turns lever 189, 190 counterclockwise thus moving link 191 and bail 25 to the left. Bail 25 in turn restores locking bars 23 against the tension of their springs 24 to home position. The depressed stems 8 are therefore released from both the locking bars 23 and plates 11 and return to their normal position under the influence of their coordinated springs 10. Arm 187 (Fig. 14) will catch beneath pin 228 as shown in Fig. 2 which will engage arm 189 to hold bars 23 in unlocking position by bail 25 as has been described. The parts are then again in their normal position and the machine is ready for a new operating cycle.

It will be understood that under ordinary conditions at least one key in each field of the key board columns has to be depressed. Since there are provided five registering fields, namely "kind of sale", "clerk number", "number of article", "identifying number" and "amount", for each registration if it shall be complete at least five keys actuated must be in the various digit columns. In order to secure complete registrations on the record card the machine of this application provides means to lock the actuating mechanism until at least one key has been actuated in each of the five registering fields.

Locking of the actuating mechanism is effected by cooperation of the pivoted member 40 (Fig. 14) with plate 41. This operation will be described more in detail later and for the present only the controlling members for lever 40 which depend upon the key mechanism will be set forth.

As may be seen from Figs. 1, 10, 13 and 14 there are provided five cross bars 42 each of them being pivoted at one end to a latch 43 and being guided at the opposite end in slots of the machine frame. The shaft 12 of each column carries a lever 44 each lever engaging with its upper end a pin 45 attached to the bars 42. All levers 44 which are coordinated to one unitary field of keys are arranged in the same plane and coact with a common bar 42 which has as many pins 45 as there are levers 44 for the associated field. It will be seen from Fig. 10 that the foremost bar 42 is coacting with five levers 44 which are associated to the five columns of the amount field. Also for each of the remaining four fields a similar bar 42 and latch 43 is provided each coacting with as many levers 44 as the respective field comprises columns. If therefore in any field only a single key has been depressed in consequence of the rocking movement of locking bar 11 the coordinated lever 44 will be rocked counterclockwise (Fig. 10) and will shift its bar 42 to the left against the tension of spring 54. The latch 43 therefore will be rocked counterclockwise and out of the path of a finger 46 which forms part of the locking member 40 for the actuating mechanism (see also Fig. 14). To continue holding of latch 43 in a position off the path of finger 46 the upper notches 47 of stems 8 are not so deep as the lower notches 48 therefore after depressing a key the bar 11 will not be able to return to its prior position and and this slight difference is sufficient to hold bars 42 far enough to the left so that latch 43 cannot be engaged by finger 46.

If therefore in each of the five key board fields at least one key has been depressed all five latches 43 will be out of engagement with the finger 46 and consequently the machine may be actuated as will be explained later. On the other hand if no registration has been set up in any one of the five fields the corresponding latch 43 will engage finger 46 and consequently the actuating mechanism of the machine will be locked against operation.

The error key 7 (Fig. 1) actuates a lever 48 (Fig. 10) to simultaneously release all keys. The error key 7 has in its stem a notch similar to those of the digit stems and this notch coacts with a plate which is fast to shaft 49 upon which lever 48 is mounted. If therefore the error key is depressed lever 48 will be rocked in counterclockwise direction (as viewed in Fig. 10) and by engaging pin 50 attached to releasing bar 30 it will move this bar to the left and consequently all levers 15 and shafts 12 will also be rocked counterclockwise so that the depressed keys in all columns are released.

Figure 7:
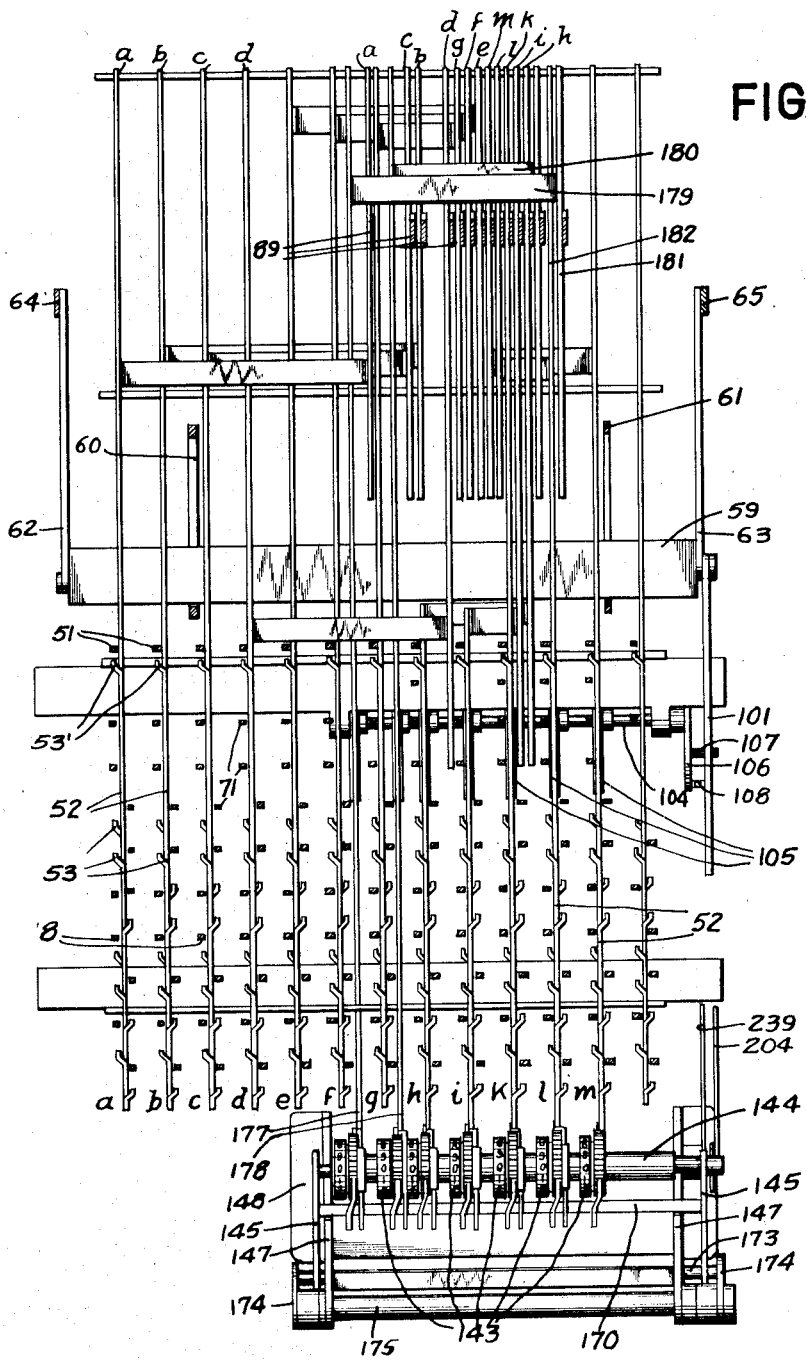
Fig. 7 illustrates the arrangement of the controlling bars which coact on the one hand with the accumulator and on the other hand with the punching mechanism (not shown in this view)

As may be seen from Fig. 10 and Fig. 7 the levers 15 are provided with lower bent terminal portions 51 which are almost in engagement with the controlling bars 52 for the punch mechanism. Each of these bars is provided with a plurality of projections 53 (Fig. 7) which cooperate with the stems 8 of the digit keys to control the punching selectors in accordance with the depressed key as will be described more in detail. If, however, "0" is to be punched no key need be depressed. For this purpose the terminals 51 of levers 15 coact with the first projection 53' (Fig. 7) of each controlling bar 52.

When in any column no key has been actuated the respective lever 15 will remain in its position and when the bars 52 move forward to their respective adjusting position the projection 53' of bar 52 will encounter terminal 51 immediately after the start of the bar and the same will be arrested in the zero position. If we assume, however, that any of the digit keys in a certain column has been depressed the lever 15 will be rocked and as has been already explained will not entirely return to its prior position though the key remains locked by bar 11. In this position the terminal 51 of lever 15 of the respective column will be out of the path of projection 53' and will not hinder the movement of bar 52 so that the same may be properly controlled by the depressed digit key.

Two controlling bars 177 and 178 (Fig. 7) are provided which are not under the control of a series of keys but are controllable by two accumulator wheels for total punching. These two wheels are provided in addition to the 5 wheels into which normally amounts are entered and they accumulate data exceeding the capacity of said five regular accumulator wheels. It will be understood that said bars 177 and 178 should be locked against operation when item actuations take place and should be free for movement only when the accumulator wheels are controlling the punching mechanism. For this purpose there are loosely provided upon two of the shafts 12 (Figs. 10 and 13) additional levers 57 and 58 which normally pass into a recess 68 (Fig. 13) of said bars and lock the same against advance movement when items are punched and consequently no punch selector will be adjusted in the corresponding punching columns during this operation.

When, however, a total card is to be punched the key 7 (Fig. 1) must be depressed and this will cause movement of bar 30 (Fig. 10) to the left and consequently levers 57 and 58 which coact with lugs upon said bar in the same way as levers 15 will be rocked out of the path of bars 177, 178. These bars will then be able to adjust their coordinated punch selectors under the control of the additional two accumulator wheels and in accordance with the adjustment of the same.

It is understood that a depressed digit key controls the coordinated bar 52 in accordance with the numerical value of the key. The stems 8 (Fig. 11) of the digit keys are provided with lower terminal portions 71. These terminals are located in a certain order on opposite sides of bars 52 and adapted to cooperate with projections 53 of said bars.

The terminal portions on the two sides of bars 52 are of different lengths (see also Fig. 4) and projections 53 are arranged on the upper and lower edges of bar 52. In this way only a certain predetermined projection 53 will coact with a certain key terminal and limit bar 52 after a movement which is in direct proportion with the numerical value of the depressed key.

Bars 52 are suitably guided in the frame of the machine and a common cross bar 59 (see Figs. 2, 3, 4 and 7) releases them for advance movement and restores them during the second half stroke to their normal position. Bar 59 is guided at both sides in slots of members 60 and 61 and is pivoted at both ends to links 62 and 63 which in turn are pivoted to levers 64 and 65 respectively fixed upon shaft 66. This shaft carries also a lever 67 (Fig. 2) having a follower 68 which slides in a slot 69 provided in plate 70.

When the machine is actuated shaft 72 will be rocked back and forth and plate 70 being fixed upon said shaft will move accordingly thus rocking lever 67 up and down and consequently causing reciprocating of arms 63 and 65. The cross bar 59 will therefore release all bars 52 during the first half stroke for advance movement under the influence of their springs 32 (Fig. 4) and they will be limited in their movement by a depressed stem 8 of the coordinated column. During the second half stroke the cross bar 59 will return and consequently will restore all bars 52 to their home position.

On one side of bar 59 there is pivoted a lever 101 (Figs. 3 and 7) having a slot 102 with a widened end portion 103. It will be understood that this lever is moved in accordance with cross bar 59. Upon the loosely mounted shaft 104 (Fig. 7) are provided a plurality of pawls 105 one being coordinated to each of bars 52 and the additional bars 177 and 178 adapted to coact with the accumulator wheels. On the end of this shaft is fast a lever 106 having a pin 107 which fits into slot 102 of the aforesaid lever 101. A spring 108 which connects lever 106 with the frame of the machine normally tends to rock shaft 104 clockwise (Fig. 3) thus causing riding of pin 107 along the upper edge of slot 102 when bar 101 moves to the right. It will be recognized that during the last part of the first and during the first part of the second half stroke pin 107 will be able to rise in view of the widened slot part 103 and this will cause rocking of shaft 104 clockwise under the tension of spring 108. Therefore the pawls 105 provided upon shaft 104 will catch into ratchets 109 provided on the lower side of bars 52 and will lock all the corresponding bars in their adjusted position until pin 107 leaves again the widened slot portion 103. This provision is made to secure adjustment of bars 52 for total punching after the accumulator is disengaged from the bars and therefore cannot control those bars any longer.

Punching mechanism

The punching mechanism includes a plurality of series of punching pins and associated punch selectors for each column.

The punch selectors for the columns "Kind of sale", "Clerk number", "Number of article", "Identifying number" and "Amount" are under the control of the keys, these fields comprise altogether as may be recognized from the card illustrated in Fig. 8 twelve punching columns which are provided on the left portion of the card. The selectors "Kind of sale" and "Clerk number" of the right hand section are connected with the selectors for the left hand column and are therefore controlled accordingly. In a similar way the selectors for the left and right portion regarding "Date" and "Operator number" are adjusted but since these designations are more or less constant at least for a great number of transactions there is no need for provision of a key board control but these selectors are adjusted by manually settable levers as will be described later.

Referring to Fig. 8 the amount field on the item cards is assigned several columns in excess of those required for the largest single item to be entered. These are for total punching as the total amount accumulated from a plurality of items usually fills more columns than any individual item does. In the present case as two extra accumulator wheels have been provided for taking care of the additional denominational orders in the total, two extra columns should also be provided in the amount field.

The punching device will now be described more in detail with reference to Figs. 1, 2, 11, 14 to 19.

Upon shaft 72 which is journalled in the frame of the machine is fast plate 73 which is turned in counterclockwise direction by means of connecting bar 74 when the handle of the machine is actuated. The plate 73 (Fig. 15) coacts with the frame for the pins and the associated punch selectors to effect punching operation. The various columns of punches 75 are guided in plates 76 and 77 which are fast to a support 78 which also carries the die plate 79 (see Figs. 16 to 19).

The record card is located between plates 77 and 79. Between plates 76 and 77 there is provided a cross plate 80 which may also be recognized in the top sectional view according to Fig. 19. Plate 80 is connected with two side plates 81 and 82 which are loosely mounted upon shaft 83.

The punching pins 75 are provided with cut away portions 87 and the reduced part of the pin fits into corresponding openings of plate 80. When the pin is pushed forward the plate 80 moves in the same direction but during the return stroke the plate 80 retracts the pins automatically.

The frame of the machine supports the shatf 84 to which levers 85 and 86 are fast these levers being spaced from each other as will be seen from Fig. 1. These levers carry in their middle portion shaft 83 and on their upper ends shaft 88. Along shaft 84 are loosely mounted a plurality of bell crank levers 89 (Fig. 16) each being provided on one arm with a slot 90 which coacts with a pin 91 attached to a controlling bar 52. To each lever 89 is coordinated a punch selector 92 loose upon shaft 83 and pivotally connected with the horizontal arm of bell crank lever 89 by link 93.

It will be seen that punch selector 92 will be adjusted according to and will select the punching pin corresponding to the adjustment of bar 52. When the arms 85 and 86 are rocked towards the punching mechanism the selectors 92 mounted upon shaft 83 will push their coordinated pin 75 through the record card and the cross plate 80 which has been advanced without any effect upon the punches will withdraw the punching pins during the return stroke.

Figure 16:
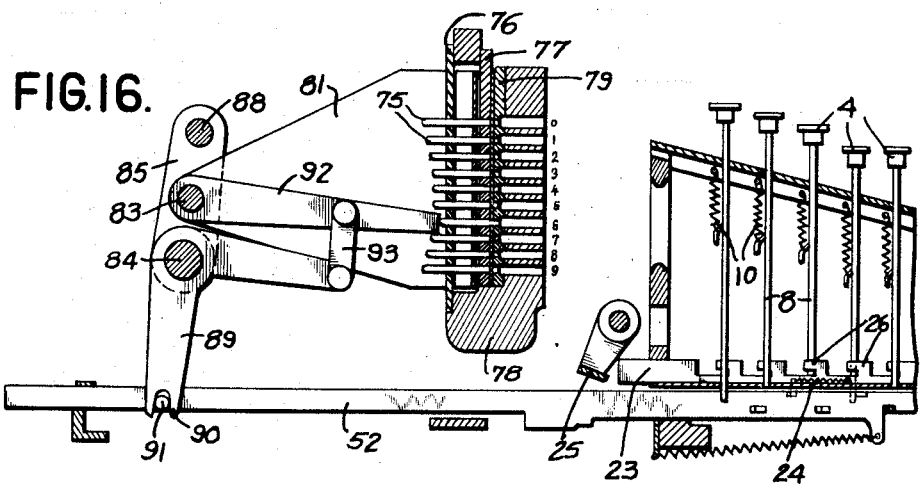
Figs. 16 to 19 show various punch selecting arrangements and the controlling elements for said selectors.
Figure 17:
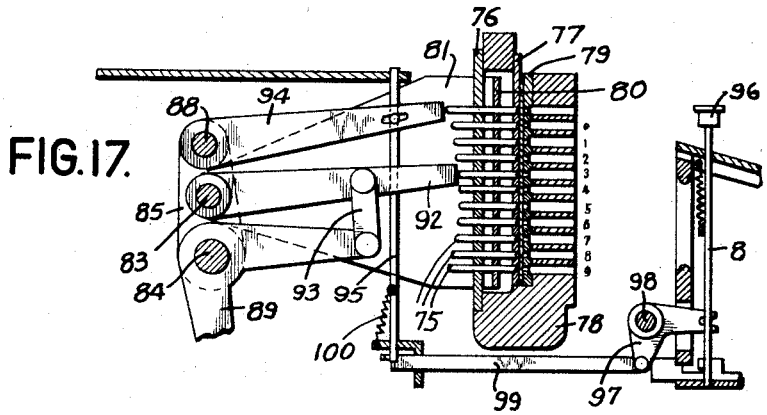

Fig. 16 illustrates a punching column in which only a single selector is adjusted as for instance in the clerk number column contrary to amount columns where a discount selector and a digit selector is provided for each column.

In each of the punching columns for the amount there is however an additional selector 94 to punch the discount designation in one of the five index point positions provided therefor on the head of the record card. The adjustment of the regular digit selector 92 in that column is effected in the same way as has been explained with respect to Fig. 16. The five selectors 94 are spaced from each other in accordance with adjacent punching columns and loosely mounted upon shaft 88. Each of the selectors 94 is connected by a pin and slot connection with a bar 95 which is suitably guided in the frame of the machine. The bar 95 normally holds selector 94 above the uppermost punching pin. If however one of the discount keys 96 is depressed the bell crank lever 97 will be turned upon shaft 98 by means of the pin and slot connection with key stem 8 and lever 97 consequently will shift bar 99 which is pivoted to one arm of said lever to the left. Bar 95 will be released and under the tension of spring 100 will move downwardly for one index point position and thus adjust the selector 94 opposite the uppermost punching pin of the respective column.

Figure 18:
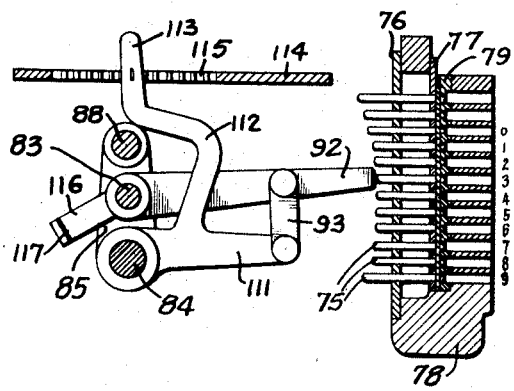
Figure 19:
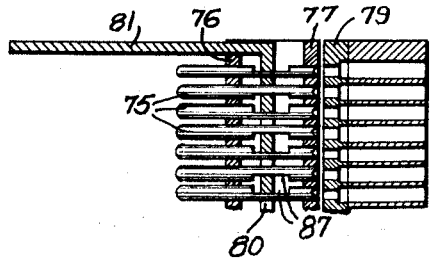

As has previously been mentioned there are provided manually settable means for the punch selectors in various columns such as in the columns for the date and operator number (see Fig. 18). The selectors 92 for those columns are mounted upon shaft 83 in the same way as the selectors in the remaining columns. They are also pivotally connected by link 93 to a lever 111 loose upon shaft 84, lever 111 has an adjusting lever 112 which reaches with its upper end 113 through a slot in the top plate 114 and coacts by means of an impulsative stop with a ratchet 115 provided in the slot of said top plate 114. Finger 113 may be manually moved into different adjusting positions and it will be recognized that punch selector 92 will be adjusted accordingly, punching will be effected when plates 85, 86 rock toward the punching pins about pivot 84 and rock the shaft 83 accordingly.

In the top plate of the machine housing (Fig. 2) there is hingedly mounted a cover 243 which may be opened to adjust the different levers 113 and also lever 221 provided for the accumulator mechanism which will be referred to later.

It will be seen from Fig. 8 that the key controlled fields for "Clerk number" and "Kind of article" and the settable lever controlled fields for "Operator number" and "Date" are punched on both sections of the card. For this purpose the punch selectors of the respective fields are provided with projections 116 (Fig. 18) and the projections of punch selectors of coordinated columns for double punching are connected with each other by cross bar 117. To avoid interference of the various members 116 and cross rod 117 which are moved up and down according to the adjustment of their coordinated punch selector they are so arranged that some of them move from a normal lower position upwardly and others move from a normal upper position downwardly without coming in the path of each other.

Actuation of the punching mechanism is effected in the following way: As will be seen from Figs. 1, 2, and 15 a plate 73 is fast upon shaft 72 said plate being connected with plate 41 by bar 74. On plate 73 are provided two pawls 117 and 118 pivoted at 119 and 120. The pawls are provided with lugs 121 and 122 passing through slots 123, 124 of plate 73. Springs 125 and 126 are fastened to said lugs on the one hand on to a common stud 127 attached to plate 73 on the other hand. Pawl 118 normally latches pawl 117 as shown in Figs. 2 and 15. Plate 73 has a projection 128 to which a roller 129 is attached. Upon shaft 84 is fast plate 130 carrying a follower 131 adapted to coact with pawls 117 and 118 said plate has also a projection 141 coacting with roller 129 for punching operations.

Normally the parts are in the position as shown in dotted lines in Fig. 2 where plates 73 and 130 are entirely out of cooperation with one another. When the handle of the machine is actuated plate 73 will be moved in counterclockwise direction and finally follower 131 (Fig. 15) will be encountered by the lower edge of pawl 117 which is locked against outward movement by pawl 118. During the further movement of plate 73 plate 130 will be turned by pawl 117 in counterclockwise direction and since said plate is fast to shaft 84 the arms 85 and 86 will be rocked and the punch selectors 92, 94 in the various columns will push their associated punching pins through the record card. Towards the end of the advance stroke of the actuating handle follower 131 of plate 130 will encounter pawl 118 and will rock said pawl against the tension of spring 126. Thereby pawl 117 will become unlatched and plate 130 after having caused punching operation is free of control of pawls 117, 118.

Immediately after the pawls have been unlatched the roller 129 of plate 73 will encounter projection 141 and thereby plate 130 will be quickly and positively rocked in clockwise direction and the whole punching mechanism will be restored. On moving clockwise the roller 131 encounters latch 118 rocking it away from pawl 117 spring 125 then draws pawl 117 again into latching position so that the device is ready for a new actuating cycle.

*Accumulator mechanism*

The accumulator comprises seven accumulator wheels 143 (Figs. 2 and 7) five of which are under the control of the controlling bars 52 associated with the amount columns of the key board. All amounts set up upon the key board are entered into the accumulator and two accumulator wheels exceeding the number of wheels for the amount columns are provided to register the totals in excess of the capacity of the five columns.

The accumulator is shown more in detail in Figs. 24, 27. The accumulator wheels 143 are loosely mounted upon shaft 144 which is carried by two levers 145 pivoted to shaft 146 which in turn is supported by side plates 147.

The controlling bars 52 coact with racks 149 to control the accumulator wheels in accordance with the adjustment of bars 52. Racks 149 are guided at their lower edges in grooves 150 provided in frame 148 and by a cross rod 151 passing through slots 152 in the racks. Each rack 149 is connected by a spring 153 with a lip 154 on the associated controlling bar 52. This bar is also provided with slots 154 into which fit guiding pins and buttons 155 fast to rack 149. Fixed to each accumulator wheels 143 is a toothed wheel 156 adapted to mesh with rack 149.

The sleeve 157 (Fig. 27) to which wheels 156 and 143 are fastened carries in addition a transfer wheel 158 provided on opposite sides with two transfer cams 159 in accordance with two sets of digits arranged upon numeral wheel 143. It will be understood that half a revolution of number wheel 143 corresponds to the entire controlling length of rack 149. The transfer mechanism operates in the following way: Excepting the units wheel there is provided a transfer wheel 158 and a coordinated transfer pawl 160 for each accumulating column. Pawls 160 are provided upon shaft 161 and held in position against a stop rod 161' by a spring 162 fastened to a cross plate 163 (Figs. 24, 25).

Upon shaft 164 are pivoted pawls 165 one for each toothed wheel 156. These pawls are normally held in the position shown in Fig. 25. A spring presses projection 167 connected with pawl 165 against cross bail 168. If, however, the accumulator is out of engagement with racks 149 which may be caused by rocking arms 145 upwardly the teeth provided on pawls 165 will catch into the toothed wheels 156 whereby levers 165 will be slightly turned in clockwise direction against the tension of springs 166 and the accumulator wheels will thus be secured against any movement while they are disengaged from their racks. Upon shaft 164 are also provided bell crank levers 168 (Fig. 26) each connected by a spring 169 with the common plate 163 and coacting at their lower portions with shoulders on lever 160. A cross bar 170 is carried by arms 145. In the normal engaging position of the accumulators with their racks the bar serves as stops for the horizontal arms of cranks 168 and when after the driving accumulating period one or a plurality of arms 145 have been rocked counterclockwise towards the then lowered bar 170 this bar will restore cranks 168 which have been released for transfer operation.

When the bars 52 start to move to the left the accumulator is disengaged from the racks which are then in relative position to the bars 52 as shown in Fig. 25. It will be recognized that during the initial movement of bars 52 they will not take along racks 149 since the pin and slot connections 154, 155 are not yet operative and the tension of spring 153 has no effect upon racks 149 when bar 52 moves to the left. At the moment that zero projection 53' reaches position of stop 51 (see Fig. 7) the pin and slot connection of bar and rack becomes operative. If the bar is stopped in zero position the rack 149 will not have been moved at all but if the bar 52 moves beyond the zero point the rack will be moved a corresponding amount.

At the end of the advance movement of the bars 52 the supporting arms 145 for the accumulator will be rocked counterclockwise in order to engage the accumulator with the racks. During the return stroke of bars 52 the racks will be moved in consequence of spring 153 to the right and enter the proper amount. On each rack 149 is provided a lug 171 which will encounter the front end of lever 160 and thus the movement of a rack 149 is stopped when the corresponding bar 52 passes the zero position. This bar, however, moves back beyond that portion to its normal position shown in Fig. 7 but this movement will not be transferred to the racks. The parts will then be in the position shown in Fig. 25. If, however, during this entering operation any accumulator wheel has been turned from 9 to 0 the cam 159 of the coordinated transfer wheel 158 will have encountered lip 172 of lever 160 which is coordinated to the accumulator wheel adjacent to that which has turned from 9 to 0 therefore lever 160 will be depressed and locked in down position by bell crank lever 168 as will be seen from Fig. 26.

Consequently this lever will not stop lug 171 during the return movement of rack 149 so that this rack can move until it is stopped by cross rod 173 and this additional movement effects entry of an additional unit so that transfer to the next higher order is properly accomplished. Rod 173 is fast to arms 174 which are fast to shaft 175. At the end of each entering cycle the accumulators are disengaged from racks 149 and bail 170 will restore bell crank levers 168 and since at the same time rod 173 will be rocked to move racks 149 to their normal position transfer levers 160 and levers 168 as well as racks 149 will be again in the position shown in Fig. 25.

When a total taking cycle takes place the accumulator wheels are meshed with racks 149 during the first semi-cycle i. e. during movement of bars 52 to the left (Figs. 24, 25) and are disengaged during the second semi-cycle. When the bars 52 start their movement to the left racks 149 will be engaged as soon as the bars pass the zero position and then rack 149 will be moved to the left and consequently wheels 156 will be turned clockwise or in other words backwards until they reach their zero position. At this point one of the cams 159 will encounter lip 172 which is now in up position and the further movement of wheel 156 will be stopped consequently the movement of the interconnected rack 149 and bar 52 which selects the punching pins. It will be recognized that in this way the punch selectors 12 being under the control of bars 52 are adjusted in accordance with the total standing on the accumulator, the accumulator incidentally being restored to zero.

It will be seen from Fig. 7 that the two bars 177, 178 which are not under key board control but only under the control of the accumulator wheels for total taking are connected by bridges 179, 180 with bars 181, 182 which control the punch selectors of the two highest denominational orders.

The mechanism for engaging and disengaging the accumulator with its racks for accumulating and total punching will now be described more in detail.

A spring 201 (Fig. 4) connecting one of the levers 145 forming part of the accumulator supporting frame with the base plate of the machine tends to engage the accumulator with racks 149. A projection of shaft 144 (Fig. 2) rests in a depression in member 202 which is pivoted at 203 and shiftable into two different positions by means of the pivotally connected rod 204. In the position shown in Fig. 2 the member 202 holds the accumulator out of engagement with racks 149. If, however, rod 204 is rocked to the right the accumulator frame will be lowered under the tension of spring 201 (Fig. 4) until the projection of shaft 144 rests upon another depression in member 202 at a smaller distance from pivot 203 and in this position the accumulator is engaged with its actuating racks.

In order to effect proper shifting of the accumulator the following mechanism is provided. On bracket 205 (Fig. 2) a double arm lever 207 is pivoted at 206. To the lower arm of this lever is pivoted shifting rod 204. The ends of both arms are provided with lugs 208 which are adapted to coact with a lever 209 (see also Fig. 20). Lever 209 has two opposite portions 210 and 211 having the particular shape shown in Fig. 20. Each of the portions 210 and 211 comprises a longer and a shorter lip portion each pair forming a groove 212 and 213 respectively.

As shown in Fig. 2 upper lug 208 fits into upper groove of portion 210 and lower lug 208 engages the longer lip of portion 211. A spring 214 attached to link 204 normally receives reliable coaction between levers 207 and 209. It will be recognized that the parts as shown in Fig. 2 hold the accumulator out of engagement with its racks.

Lever 209 is pivoted at 215 to lever 216 having a slot 217 at its upper end which coacts with a pin 218 on one arm of a multiple arm lever 238. This lever is pivoted at 219 to the machine frame. Arm 242 of multiple arm lever 218 is pivoted to bar 220 which in turn is pivoted to a hand settable lever 221 pivoted upon shaft 84. A tension spring 222 (Fig. 2) normally draws the parts to the right and holds the same in the position shown in Fig. 2 for item punching.

Lever 209 is also pivoted at 223 to a double arm lever 224 having its pivot 225 on the frame of the machine. An upper projection 226 and a lower projection 227 are adapted to coact with the lug 228 upon plate 70 which is turned in counterclockwise direction when the handle of the machine is actuated (Fig. 2).

During the first semi-cycle of the handle lug 228 will move in counterclockwise direction until at the end of this semi-cycle it encounters portion 227, (see also Fig. 20). This will cause lever 224 to rock about its pivot 225 and consequently lever 209 will move to the left. The short lip of lever portion 210 will engage the upper lug 208 whereby double arm lever 207 will be rocked about its pivot 206 these parts will therefore move from the position of Fig. 2 to that illustrated in Fig. 20. It is obvious that by rocking lever 207 in counterclockwise direction the lever 204 will be moved to the right and consequently the accumulator will be shifted into engaging position.

During the second semi-cycle when the handle returns to its normal position the amount having been adjusted by the controlling bars 52 will be entered into the accumulator. At the end of the cycle stud 228 will again engage projection 226 of lever 224 this lever will be turned in counterclockwise direction and therefore will also rock lever 209. The longer lip of upper projection 210 will rock double arm lever 207 in clockwise direction and the parts will be restored again to the normal position in Fig. 2 where shifting levers 202, 204 hold the accumulator in disengaging position.

When for the purpose of total punching the punch selectors have to be controlled by the accumulator wheels the reverse actions must take place; in this case the accumulator must be in engagement with the controlling racks and control their movement during the first semi-cycle while they are disengaged from each other during the second semi-cycle. For total punching the lever 221 is manually moved from the position shown in Fig. 2 to the left against the tension of spring 222. By means of connecting rod 220 lever 218 will be turned (Fig. 20) and pin 218 will slide downwardly in slot 217 of lever 216. When pin 218 encounters the bottom of slot 217 it will press lever 216 downwardly and consequently rock lever 209 about pivot 223. This causes the lower lug 208 to slide into the groove of lower projection 211 whereby double arm lever 207 will be rocked and bar 204 moved to the right thus effecting shifting of the accumulator into engaging position. Levers 207 and 209 are then from the beginning of the machine cycle in the relative position shown in Fig. 20.

In order to maintain accumulator engagement during the first-semi-cycle the following arrangement is provided (Fig. 20). Upon the machine frame is pivoted at 229 a double arm lever 230 which is normally held in position by means of a spring 231 against a stop 232. One arm of lever 230 is provided with a shouldered portion adapted to coact with a stud 234 provided upon arm 235 of multiple arm lever 218. When lever 218 is turned in counterclockwise direction the shoulder 233 will latch that lever and therefore also the accumulator will be latched in engaging position.

At the end of the first semi-cycle it will be understood that at this time the accumulator wheels have already completed the adjustment of the punch selectors lug 228 will encounter projection 227 and will rock lever 209 about pivot 215. This will cause lever 207 to rock in clockwise direction rod 204 will be moved to the left and the accumulator will be shifted into disengaging position during the second semi-cycle. Upon the right hand arm of lever 230 is pivoted a pawl 235 being held by a spring 236 against a stop 237 fast to lever 230. When lug 228 moves downwardly during the first semi-cycle it will meet pawl 235 but in view of the resilient mounting of said pawl there will be no effect upon lever 230. When, however, lug 228 returns from the lower to the upper position it will again encounter pawl 235 but at this time the pawl will be pressed against stop 237 lever 230 will be turned in counterclockwise direction and thus stud 234 will be unlatched and lever 218, rod 220 and hand lever 221 will be immediately restored by spring 222 to their normal position as shown in Fig. 2.

With arm 238 of multiple arm lever 218 is pivotally connected a bar 239 (Figs. 2 and 20) which in turn is pivoted at 240 to a pivotally mounted arm 241. Upon both ends of shaft 175 (see also Figs. 24–27) are pivoted arms 174 which carry a cross rod 173 the transfer function of which has been described previously.

When lever 221 (Fig. 2) is set up for total punching bar 239 will be moved to the right and arm 241 will be rocked about 146. Arm 241 will encounter rod 173 and rock the same towards the racks which are one unit beyond their normal position in consequence of any transfer operations which have occurred in the preceding cycle thus these racks will be restored to normal position before total punch control so that the punch selectors are properly controlled in accordance with the amount standing in the accumulator.

Card feeding device

Figure 6:
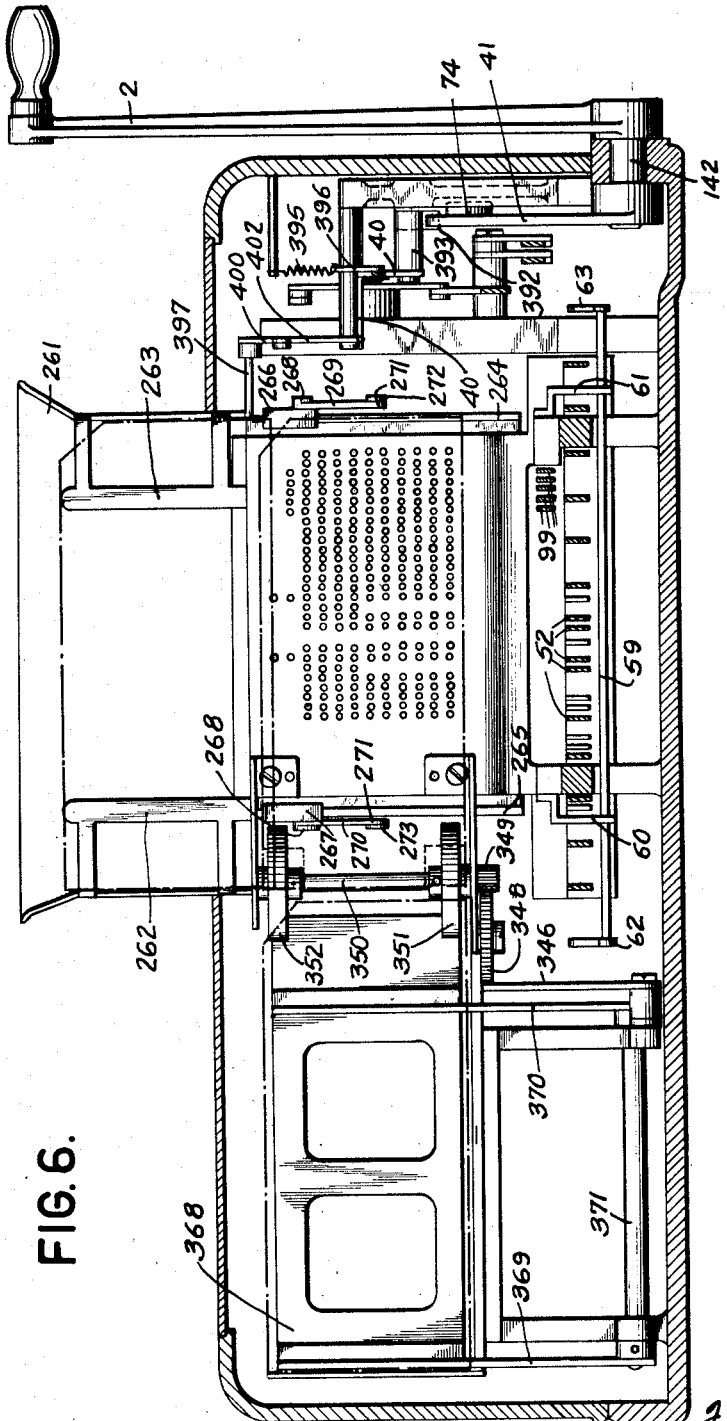
Fig. 6 is a cross sectional view according to line 6—6 of Fig. 1.

Before the machine is operated by handle 2 to enter the data set up upon the key board into the accumulator and to punch a card accordingly a blank card is inserted by hand into the chute 261 (Fig. 6). The chute 261 includes holders 262 and 263 which hold the card but leave the major part of the card uncovered so as to enable reading of data recorded upon the card. It will be understood that on the rear side of the card represented in Fig. 8 there are hand written data which are to be set up upon the key board and in accordance with which perforations in the same card shall be provided. The card is therefore inserted into the chute in such a way that the rear side bearing the hand written records may be viewed from the key board side. The operator then sets up the key board in accordance with the hand written records and finally operates the machine by actuating handle 2.

As has been previously explained the card will be punched when it is in position between plates 77 and 79 (Fig. 4) and will then be fed to the receptacle. These feeding operations will now be described. As will be recognized from Figs. 1, 6 and 9 two guiding bars 264 and 265 are provided which are embraced by slidable blocks 266 and 267. Each of these blocks is pivoted at 268 to a link 269 and 270 respectively which links are in turn pivoted at 271 to operating levers 272 and 273 respectively. Levers 272 and 273 are fast to shaft 274. To this shaft is also fast a lever 275 (Fig. 2) having a follower 276 which slides in a slot 277 provided in plate 278. Said plate is fixed upon shaft 72 and it will be remembered that said shaft is rocked by means of plate 73 connecting rod 74 and plate 41 as soon as the handle 2 is actuated. In this case therefore plate 278 will be moved counterclockwise (as viewed in Fig. 2) during the first half-stroke and arm 275 will also be rocked thus turning shaft 274 and moving the levers 272 and 273 downwardly.

The sliders 266 and 267 (Fig. 9) are each provided with a pair of fingers 279, 280, one finger being fast to the slider and the other being attached to a lever 281 which is pivotally connected at 283 with the slider. A spring 284 tends to engage fingers 279 and 284 with each other but normally the parts are held in the position shown in Fig. 9 against a stop pawl 285. As soon as actuation of the handle is initiated said pawl is released as will be later explained, springs 284 will turn levers 281 and each of the two pairs of fingers 279, 280 will firmly grip the card on each end. It will be understood that until this operation takes place the card is held by stops 286 in upper position so that it may be viewed through the chute as has been described.

When the arms 272 and 273 are moving downwardly the coordinated sliders 266 and 267 will take the card down between die plates 77 and 79. The downward movement of the card is stopped by the bottom of frame 78 (Fig. 4) while the clips 279, 280 move still lower. Consequently the card will be entirely drawn out of these clips and properly positioned with respect to the die plates. Before arms 272 and 273 and consequently the two pairs of clips 279, 280 start their upward movement the card has been punched as has been already described and it is quickly fed from the punching position to the card receptacle.

It will be noticed from Fig. 2 that the lower part of slot 277 of plate 278 has a dwell and since arm 275 and thereby levers 272 and 273 are controlled by said slot it will be understood that during the first third of the return stroke arm 275 will not be moved and consequently clips 279, 280 will stay in their lower position so that any interference with the card is avoided. During this period the card will be removed from the punching position to the receptacle as will now be described and when the clips start their upward movement they will find the path cleared of the card.

On the right side of shaft 72 (as viewed in Fig. 1) there is fast a lever 288 (Fig. 9) pivoted at 289 to a link 290. A pin 291 is fast to the frame of the machine and passes through a slot 292 provided in link 290 to guide the same. Upon the upper portion of link 290 there is pivoted at 293 a lever comprising two arms 294, 295. This lever is held in position by spring 296 against a stop 297 provided on link 290.

On the frame of the machine there is pivoted at 298 a three arm lever 299, 300, 301. Arm 299 has a shoulder which normally engages a stop 302 provided on lever 285. A spring 303 connects arm 300 and lever 285 and holds the parts in position as shown in Fig. 9. The arm 301 is provided with a lug 304. Lever 306 which is provided for restoring purposes is fast to shaft 307. Shaft 307 carries also lever 285 and extends along the card chute carrying a similar lever 285 at the other end which is adapted with the corresponding lever 281 on that end.

When shaft 72 is rocked counterclockwise lever 290 will be pulled downwardly and arm 294 will encounter lug 304. Since arm 294 is prevented from clockwise movement by stop 297 it will rock three arm lever 299, 300, 301 about pivot 298 and thereby lever 285 will be released. Spring 303 pulls lever 285 to the right and also the lever 285 at the other end of shaft 307 will move in the same way thus releasing the pawls 281 so that fingers 279, 280 may grip the card. Restoring of levers 285 is effected at the end of the first half stroke. At this time bell crank lever 308 will rock about its pivot 309 and a pin 310 provided on the upper arm of said lever will encounter restoring finger 306, this will cause shaft 307 to rock clockwise (Fig. 9) and lever 285 will be latched again by arm 299.

To the upper end of bell crank lever 308 is pivoted a member 331 (Fig. 21) which is connected with the feeding roller mechanism. Rocking of lever 308 about pivot 309 will cause engagement of the card feeding rollers which remove the card from punching position as will be explained later.

Bell crank lever 332, 333 (Fig. 9) is pivoted at 334 to the frame of the machine. A spring 335 connects the pivot 334 with the lower horizontal arm 336 of lever 308 and arm 332 is connected with lever 308 by spring 337. Arm 332 has a latching portion which coacts with a lug 338 provided upon lever 308. The parts are normally held in latched position as shown in Fig. 9 and in this position the feeding rollers for the card are out of engagement.

At the end of the first half stroke, however, the follower 339 which passes within a slot 340 in plate 287 which now has been turning counterclockwise will have reached almost the opposite end of the slot but in view of the widened slot in this part follower 339 will not engage the outer periphery of slot 340. At this time pin 341 provided on plate 287 will strike arm 333 will turn lever 332, 333 about its pivot 334 and this will cause unlatching of lever 308 so that the same may rock counterclockwise under the tension of spring 335. This causes restoring of lever 306 by pin 310 and also engagement of the feeding rollers by moving link 331 (Fig. 21) towards the card. When plate 287 moves from its extreme left position (Fig. 9) clockwise during the return stroke follower 339 slides along the outer shape of slot 340, when the follower reaches the portion 342 lever 308 will be rocked clockwise and arm 332 will again coact with lug 338 to latch said lever in the position shown in Fig. 9. It will be understood that the ratio of the gearing for the card feeding mechanism is such that the card has been fed entirely from the punching position to the receptacle when portion 342 reaches follower 339 to rock lever 308 clockwise and consequently to disengage the feeding rollers.

Figure 5:
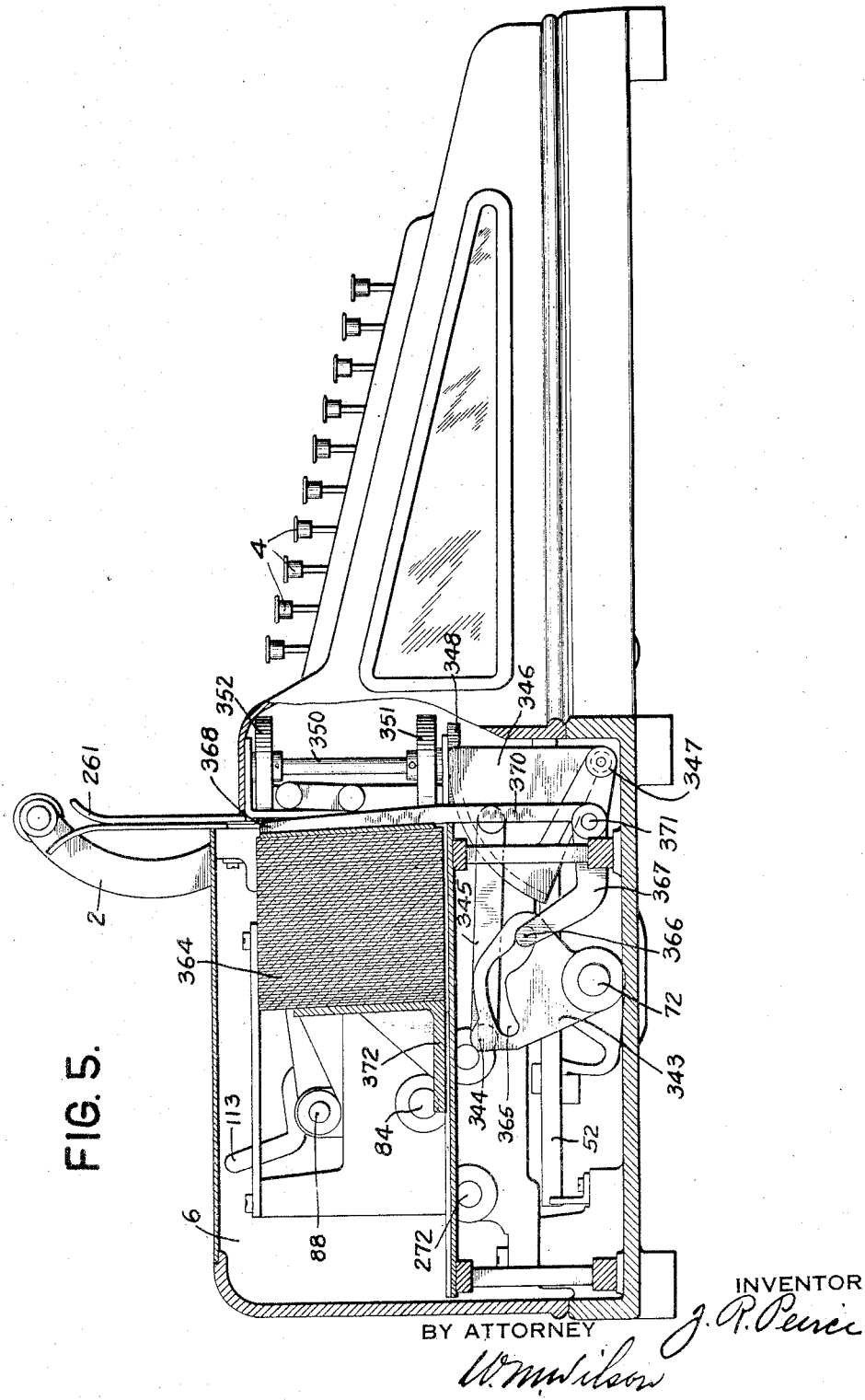
Fig. 5 is a view on line 5—5 of Fig. 1 and shows a section through the card receptacle.

At one end of shaft 72 there is fast thereto a plate 343 (Fig. 5). At 344 there is pivoted a link 345 to plate 343 which link connects said plate and a toothed segment 346 to which the link is also pivoted. Segment 346 is pivoted at 347 to the frame of the machine. The segment meshes with toothed wheel 348 loosely mounted on the machine frame which wheel in turn meshes with pinion 349 (Fig. 6) being fast to shaft 350 vertically extending along the ejecting chute for the card. This shaft is supported by the machine frame and carries a lower and an upper card feed roller 351 and 352 respectively which are covered on their periphery with yielding material 353 such as rubber or the like (Fig. 21). The rollers 351 and 352 pass through slots 354 in the guide plate 355 (Fig. 21) and in the opposite guide plate 356 are provided similar slots 357 for feed rollers 358 and 359 (Fig. 22). These feed rollers correspond to rollers 352 and 351 and are mounted upon a shaft 360 which also extends along the card chute and is carried on the lower and upper end by links 361. These links are fast to a shaft 362 to which also the member 363 is fast which on its other end is pivoted to link 331. If, therefore, link 331 is moved in the previously described manner shaft 360 will be swung towards the chute and rollers 358 and 359 will pass through the slots 357. It will be observed (Fig. 6) that the record card when in punching position is just in contact with its left end portion with rollers 351 and 352. If now within the first half stroke plate 343 (Fig. 5) moves to the right segment 346 will turn in clockwise direction this will cause wheel 348 to rotate counterclockwise as viewed in Fig. 1 and rollers 351, 352 to rotate clockwise. These rollers will engage the end portion of the card located between plates 355 and 356 (see also Fig. 21) but since no other elements coact with said rollers they will merely slide upon the card without any effect upon the same.

When, however, punching operation has been effected and the return stroke is about to take place the rollers 351, 352 (as viewed in Fig. 1) will now move in counterclockwise direction as has been previously described, rollers 358 and 359 are swung towards the card and coact during the ejecting period with rollers 352 and 351 respectively so that the card is quickly removed from the punching chute to the receiving stack 364.

Referring to Fig. 5 it will be noted that a slot 365 is provided in plate 343 in which slot a pin 366 attached to a lever 367 is guided. Lever 367 forms part of a frame which comprises the frame plate 368 (see also Fig. 6) and two arms 369 and 370 which are fast to shaft 371 being loosely mounted in the frame of the machine. Slot 365 has two dwells and a sharp curve portion. The dwells cause the frame 368 to stay either in engaging or disengaging position while the sharp curve will cause rocking of the frame from the one to the other position. Normally the frame 368 engages the card stack and holds the slightly tilted cards towards the angular slider 372. Towards the end of the first half stroke, however, the frame 368, 369, 370 is rocked to the right (as viewed in Fig. 5) and immediately afterwards at the beginning of the second half stroke the card will be fed from the punching chute as has been described between the stack 364 and frame 368. Frame 368 then rocks again to the left, engages the card and presses it against the card stack 364.

It is understood that if a total card has been punched the same shall not be fed to the receptacle since it would be mixed there with the item cards, it is desirable that the total card be ejected again so that the operator may lay it aside and collect all total cards separately from the item cards which are collected by the machine. For this purpose the cards which are provided to receive the total have cut away portions 373, 374 (Fig. 8) it will be noticed from Fig. 6 that the feeding rollers 351, 352 and 259, 358 which are adapted to eject the card from the punching chute to the receptacle are unable to engage a total card because of the aforesaid cut away portions, when therefore during the return stroke clips 279, 280 now being closed ascend they will lift the total card until it has reached the chute 261, 262, 263 whence it may be removed by hand.

When the two pairs of clips 279, 280 have reached their highest position they are reopened by the engaging levers 285 (Fig. 9) which have been restored to their normal position previously as has been described in a prior part of this specification.

*Control for actuating mechanism*

The present machine provides means for locking the actuating mechanism if the key mechanism has not been actuated in all fields and also if there is no card in punching position. These means are illustrated generally in Figs. 1, 2 and 6 but may be more clearly understood from Fig. 14 of the drawings.

Upon journal 391 (Fig. 14) which is fast to the frame of the machine is provided a finger 392 which is connected by sleeve 393 with lever 40 whose function and cooperation with pawls 394 has been previously explained. It is only necessary to remember that each pawl 394 is associated with a control lever 42 one being provided for each key controlled record field. As soon as at least one key has been depressed in a field the corresponding pawl 394 will be rocked and will unlatch finger 46 of lever 40. If therefore at least one key has been actuated in each of the five fields lever 394 will unlatch finger 46 so that the mechanism 40, 393, 392 may rock about its pivot 391 under the influence of a spring 395 which is connected with lever 40 through a pivoted link 396. There is, however, provided still another control mechanism for the lever 40 which mechanism is under the control of a record card in punching position.

A shaft 397 is journalled at one end in the frame work of the machine and carries a member 398 arranged in the path of the record card 399 (Fig. 14). At its free end the shaft 397 is provided with a link 400 fast thereto which link is pivoted to another link 401 which in turn is pivoted to an arm 402 which is connected through a sleeve 405 mounted upon shaft 404 with an arm 403. This arm has a shouldered terminal portion which coacts with a projection 406 of lever 40.

It will be remembered that plate 41 is connected on the one hand with the actuating handle of the machine and that on the other hand the actuation of all other parts is dependent upon the actuation of plate 41. If therefore lever 40 is locked either by one or a plurality of pawls 394 or by arm 403 or by both simultaneously plate 41 will be prevented from movement in counterclockwise direction since the portion 407 will encounter finger 392 which will prevent further movement of the plate. If, however, a card has been properly inserted into the punching chute member 398 (Fig. 14) will be rocked counterclockwise and it is obvious that by means of the linkage connected thereto arm 403 will be lifted and will unlatch projection 406. If then in addition thereto all levers 394 unlatch finger 46 due to the fact that in each field of keys at least one key has been actuated lever 40 is free to rock about its pivot 391. When plate 41 is turned in counterclockwise direction finger 392 enters the recess 408 and is turned clockwise to the position shown in dotted lines in Fig. 14. When plate 41 moves further to the left finger 392 slides resiliently over the outer curve of plate 41 until it enters the recess 409 at the other end of the plate. When the plate starts its return movement in clockwise direction finger 392 and consequently lever 40 will be again restored to the position shown in Fig. 14 and as soon as the card has been removed from the punching chute and the keys have been released lever 40 will be locked again by pawls 394 and arm 403. In order to ascertain a complete actuation stroke and prevent return of the handle and actuating parts before the first half stroke has entirely completed the plate 41 is provided with notches 410. These notches are adapted to coact with finger 392.

When the plate moves to the left finger 392 is in the position shown in dotted lines in Fig. 14 and is resiliently engaging the edge of the plate on account of spring 395. If therefore an attempt should be made to return the handle which is connected to plate 41 before the recess 409 has reached the finger 392 the finger would catch into the next notch 410 when the plate is moved in return direction and would lock the same against any further return movement. It is therefore necessary that in each cycle the handle be moved to its extreme position as otherwise return to its normal position would be prevented.

*General operation of the machine*

The operator inserts the record card into the card chute 261 (Fig. 2) so that he faces the rear side of the card bearing hand written records. Then he sets up the key board which will be locked during the actuation cycle and sets also the manually adjustable levers 113. Errors may be corrected as has been described. Then the handle 2 is actuated and during the advance stroke of the same the card will be gripped and fed into punching position. Simultaneously therewith bars 52 have adjusted the punch selectors under the control of the depressed keys and punching operation will take place. During the return stroke of the handle the accumulator is in engagement with bars 52 an amount corresponding to that which has been punched is entered into the accumulator and the same will be automatically disengaged at the end of the cycle. Before the card feeding clips start their upward movement during the second half cycle the card will be engaged by the feeding rollers and conveyed to the receptacle where all item cards are collected. At the end of the cycle all keys are released and all parts have been restored to their normal position so that the machine is ready for a new operation. The same operations take place during subsequent cycles when item cards are prepared.

If, however, a total card shall be prepared in accordance with the adjustment of the accumulator the operator will move lever 221 (Fig. 2) to the left in order to engage the accumulator with bars 52 during the first half stroke and to control the punch mechanism through the accumulator. It is understood that no digit key is depressed when totals are taken but the operator depresses key 7 (Fig. 1) when actuating the handle for total taking operations. During the return stroke of a total cycle the accumulator will be automatically disengaged from bars 52 and restored under control of the key mechanism for the next item cycle. As has been described total cards are provided with particular cut away portions so that they may not be gripped and fed to the card receptacle but they are lifted again through the feeding clips. The operator removes the total cards from the chute and collects them separately from the item cards which are in the card receptacle of the machine.

While there has been shown and described the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a punching machine, punching means, a bank of sales amount keys each for controlling the punching means to punch the amount of a sale on a card, a locking member for holding an amount key in actuated position, operation of one key releasing a previously actuated key from the locking member, a discount key in the same bank as the amount keys adapted to be locked by the same locking member, and means whereby said discount key is ineffective to release the locking member from any of the previously actuated keys.

2. In a punching machine, punching means for punching different classes of record sheets, feeding means for feeding one class of said record sheets after a punching operation, said feeding means being ineffective to feed another class of record sheet after a punching operation, and means for ejecting the latter class of record sheet from the machine.

3. In a punching machine, punching means for punching two classes of record sheets, means for feeding one class of record sheets out of cooperative relation with the punching means after a punching operation, and a separate feeding means for feeding the other class of record sheet out of cooperative relation with the punching means after a punching operation.

4. In a punching machine, punching means for punching record sheets, a single feeding device for both engaging and feeding a certain class of record sheet into punching position and after the punching operation ejecting it in a predetermined direction from punching position, and means for ejecting another class of record sheet after punching operation in a different direction than aforesaid.

5. In a punching machine, punching means for a card, means for operating the punching means, a card chute adapted to receive only one card at a time and into which cards to be punched are manually inserted one at a time, and means for preventing operation of the operating means prior to insertion of a card in the chute.

6. In a punching mechanism, a series of keys, a series of punches, a punch selector differentially and commonly controlled by said keys to select a punch in accordance with an actuated key and a supplementary punch in addition to and in alignment with said series of punches, said supplementary punch being under the control of a single key associated and in alignment with said series of keys.

7. A punching mechanism for record cards in combination with means to feed cards of different classes to said punching mechanism, a receptacle and means to convey one class of the cards from punching position to said receptacle, said conveying means being incapable of conveying cards of another kind having a designation distinguishing them from cards of the first kind.

8. In a punching mechanism for record cards, reciprocating feeding means adapted to feed the card into punching position by an advance stroke, a card receptacle and conveying means operative to feed the card from punching position to said receptacle, said conveying means being under the control of said card and being prevented from conveying a card having a predetermined designation which cards are ejected from punching position by said reciprocating feeding means during the return stroke of the same.

9. A machine according to claim 17 wherein said reciprocating means feed the card in one direction and said conveying means feed undesignated cards in a normal direction and designated cards in a direction opposite to said first mentioned direction.

10. In a punching mechanism for record cards, reciprocating feeding means adapted to feed the card into punching position by the advance stroke and to return the card upon the return stroke, a card receptacle, a pair of feeding rollers normally disengaged and means to engage said feeding rollers after punching operation to convey the card from punching position to said receptacle, said means becoming operative before said reciprocating feeding means start for their return stroke whereby the rollers remove the card unimpeded by the reciprocating feeding means.

11. In a punching machine for record cards, reciprocating feeding means adapted to feed a card into punching position on the advance stroke, a card receptacle, a pair of feeding rollers normally disengaged and means to engage said feeding rollers after punching operation to convey the card from punching position to said receptacle, said latter means becoming operative before said reciprocating feeding means start for their return stroke, said feeding means feeding the cards in one direction to punching position and said feeding rollers conveying the card in a direction rectangularly thereto to the receptacle.

12. A machine comprising means for effecting an entry on cards of different characteristics and means for ejecting the cards in different directions depending on the card characteristics.

13. A machine for operating on cards, comprising means for recording on cards of different characteristics successively and one at a time, and means for ejecting said cards differently depending solely on the characteristic of the card acted on independently of any other cards.

14. A machine for operating on cards comprising means for acting on the cards, means for engaging some of the cards to eject them after they have been acted on, some of the cards being shaped to prevent engagement with and resultant ejection by said ejecting means, and separate means for ejecting the latter cards.

15. In a machine, means for perforating different classes of cards, means for feeding both classes in the same direction to the perforating means, means for continuing the feeding in the same direction of one class of card after the perforating operation, and means for reversing the feeding of the other class of card after the perforating operation to return the latter class substantially to starting position.

16. In a machine of the class described, a device for acting on record cards, means for feeding different classes of cards to the device, a card receptacle relatively inaccessible to the operator, means for feeding one class of cards after being acted on to the receptacle, and means for feeding cards of another class after being acted on into a location accessible to the operator whereby the latter may remove the latter class of cards at will.

17. In a machine of the class described, record-effecting means, card guides accessible at one end to the insertion of a card by the operator, means for feeding the card in the guides to the record-effecting means, and means for automatically returning the card after a recording operation thereon to the accessible end of said guides to enable the operator to remove the card.

18. In a machine of the class described, a housing, record-effecting means within the housing, a card chute partially extending within the housing and having one end extending exteriorly to the housing to receive a card insertible at will by the operator, means within the housing for feeding the card from the chute to the record-effecting means, and means for returning the card after the recording operation to the chute into position enabling the operator to remove the card from the chute.

19. In combination, means for effecting a record on a card, means movable in one direction for feeding a card to the record-effecting means and adapted upon return movement to return the card to initial position, and means for ejecting the card from the record-effecting position before the return stroke of said feeding means to prevent ejection of the card by the latter.

20. In a machine of the class described, means for recording on a card, means for gripping the leading end of a card to feed to the recording means, and separate means for gripping the card above the leading end to eject the card after the recording operation.

21. In a machine, a chute for receiving cards, means for recording on said cards, mechanism for actuating said means, a member rigidly connected to said mechanism, a detent for engaging said member to lock the mechanism against operation, and means actuated by the advance end of the card inserted in said chute for releasing said detent from the member.

22. In a machine of the kind described, a record-effecting device, a plurality of classes of selectors for controlling said device, means for operating the device in accordance with operation of the selectors, a detent for locking the operating means, and latches, one corresponding to each class for engaging the detent and each released from the detent upon operation of a selector of the corresponding class.

23. In a machine of the class described, a card chute into which a card is manually insertible, a device for acting on the card, means for selectively determining operation of said device, mechanism for operating the device as determined by said means, and a detent controlled by said means and by said card for preventing operation of the mechanism until said means has been completely and properly operated and the card fully inserted in the chute.

24. A device of the class described, comprising a bank of punches adapted to perforate a card with cost data, a bank of selectors, a device commonly and differentially controlled by said selectors for causing one of said punches to perforate a card according to the actuated selector, a supplementary punch alined with the other punches for punching discount data related to said cost data, and a single selector for controlling the supplementary punch only.

25. A device of the class described, comprising a bank of recording elements, a bank of selectors, a member controlled by any one of said selectors for differential operation to coact with said elements for causing the latter to make a record in accordance with the actuation of the selectors, a supplementary recording element for recording supplementary data related to the data adapted to be recorded by the other elements and in alinement with the latter, a member non-differentially movable an invariable distance into coaction with said supplementary recording element to cause the latter to operate, and a single control for said member adjacent said selectors.

In testimony whereof I hereto affix my signature.

JOHN ROYDEN PEIRCE.

CERTIFICATE OF CORRECTION.

Patent No. 1,867,027.  July 12, 1932.

JOHN ROYDEN PEIRCE.

It is hereby certified that error appears in the printed specification of the above numbered patent requiring correction as follows: Page 13, line 125, claim 9, for the claim number "17" read 8; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.